Patented Sept. 1, 1942

2,294,401

UNITED STATES PATENT OFFICE 2,294,401

COMPOSITION FOR THE TREATMENT OF POULTRY COCCIDIOSIS

Leslie Reginald Harrison, Vancouver, British Columbia, Canada

No Drawing. Application February 16, 1939, Serial No. 256,822

5 Claims. (Cl. 167—53.1)

This invention relates to, and has for its object the provision of compositions for, the treatment of coccidiosis in poultry; which compositions are inexpensive, nontoxic, and effective, being capable of attacking the coccidium parasite in the early stages of its development.

Coccidiosis is a very contagious protozoan disease causing high mortality among the domestic fowl. The coccidia invade and destroy the epithelial tissue of the small intestine and ceca of the fowl, bringing about hemorrhage and serious interference with digestion, or even starvation. Infected birds succumb rapidly, or are rendered uneconomic by the chronic forms of the disease.

Coccidial infections of poultry are cecal and/or duodenal. Cecal coccidiosis, produced by the parasite Eimeria tenella, is of widespread occurrence among young chickens, the lesions being in the ceca. Duodenal coccidiosis, with lesions in the upper two-thirds of the small intestine, is produced principally by E. necatrix, though other species of less pathogenicity, particularly E. acervuline and E. mitis, may be involved. It is common in chickens of all ages, especially in maturing pullets. Immunity to E. necatrix being often delayed, the disease frequently becomes chronic.

Numerous preparations have been advanced for the treatment of coccidiosis, but most of these are expensive and worthless. This is borne out by the fact that, in spite of the known preparations, coccidial infection of poultry is responsible for an annual loss of several million dollars in North America.

The poultry anticoccidiotic of this invention essentially comprises, preferably in substantially equal proportions, colloidal sulfur and a member of the group consisting of urea and thiourea.

The following is an example of a composition useful in the treatment of coccidiosis in poultry, but it is to be understood that this example is illustrative only and not in any sense limitative. It is intended that this invention shall include variations of the proportions given and obvious chemical equivalents for any of the ingredients named.

| Ingredients: | Parts by weight |
|---|---|
| Urea or thiourea | 50 |
| Sulphur (colloidal) | 50 |
| Total | 100 |

The calculated therapeutic dose for this composition is 0.8 gram to 1.6 grams per kilogram bird weight. In practice, the composition is administered in the mash part of a poultry ration in the desired percentage, computed from the therapeutic does and the average mash consumption per kilogram bird weight.

In order to protect a chicken from coccidiosis, this composition may be administered continually during the period in its life when it is most susceptible to infection, at the rate of about 1% in the mash part of the ration. For the purpose of alleviating and checking the spread of coccidiosis in a flock, the composition may be fed at the rate of about 2% in the mash part of the ration for a suitable period. It has been found desirable to feed the 2% composition to the poultry for at least 14 days, after which the dose may be reduced to 1% and administered until the danger from infection is considered to have diminished or to have been eliminated.

The therapeutic action of the composition is believed to be due to the following (but it is not intended that the invention be limited by any theory of action):

(1) Direct parisitotropism:
   (a) Destruction of extra-cellular stage (sporozoite) of parasite by polysulphides formed from the interaction of the urea and sulphur—in the alimentary tract of the host. In this case, it is believed that the urea is in part converted into ammonium carbonate, which in turn reacts with hydrogen sulphide to form polysulphides.
   (b) Destruction of sporozoites by direct contact with colloidal sulphur.
   (c) Destruction of immature schizonts, probably by urea.

(2) Activation of tissue macrophages and consequent destruction of merozoites. The cause of this activation by the components of the composition is not understood, but the process can be seen on microscopic examination.

(3) Flush action of the sulphur, an important feature in coccidiosis, in that first and second generation oöcysts are eliminated, thus preventing continuation of the infection.

The compositions of this invention have been found to be effective in inhibiting coccidial infections of all types; and they are not appreciably toxic for fowl, and can be administered over long periods of time in the prescribed dose with a wide margin of safety.

It will be apparent that the compositions of this invention are adapted to check the coccidium parasite in its early stages of development as well as relieve the fowl even after the disease has secured a good foothold.

The invention may be variously otherwise embodied within the scope of the appended claims.

What I claim as my invention is:

1. A poultry anticoccidiotic essentially comprising colloidal sulfur and urea.
2. A poultry anticoccidiotic consisting of substantially equal proportions of colloidal sulfur and urea.
3. A poultry anticoccidiotic essentially comprising colloidal sulfur and a member of the group consisting of urea and thiourea.
4. A poultry anticoccidiotic consisting of substantially equal proportions of colloidal sulfur and a member of the group consisting of urea and thiourea.
5. A poultry anticoccidiotic essentially comprising colloidal sulfur and thiourea.

LESLIE REGINALD HARRISON.